United States Patent Office.

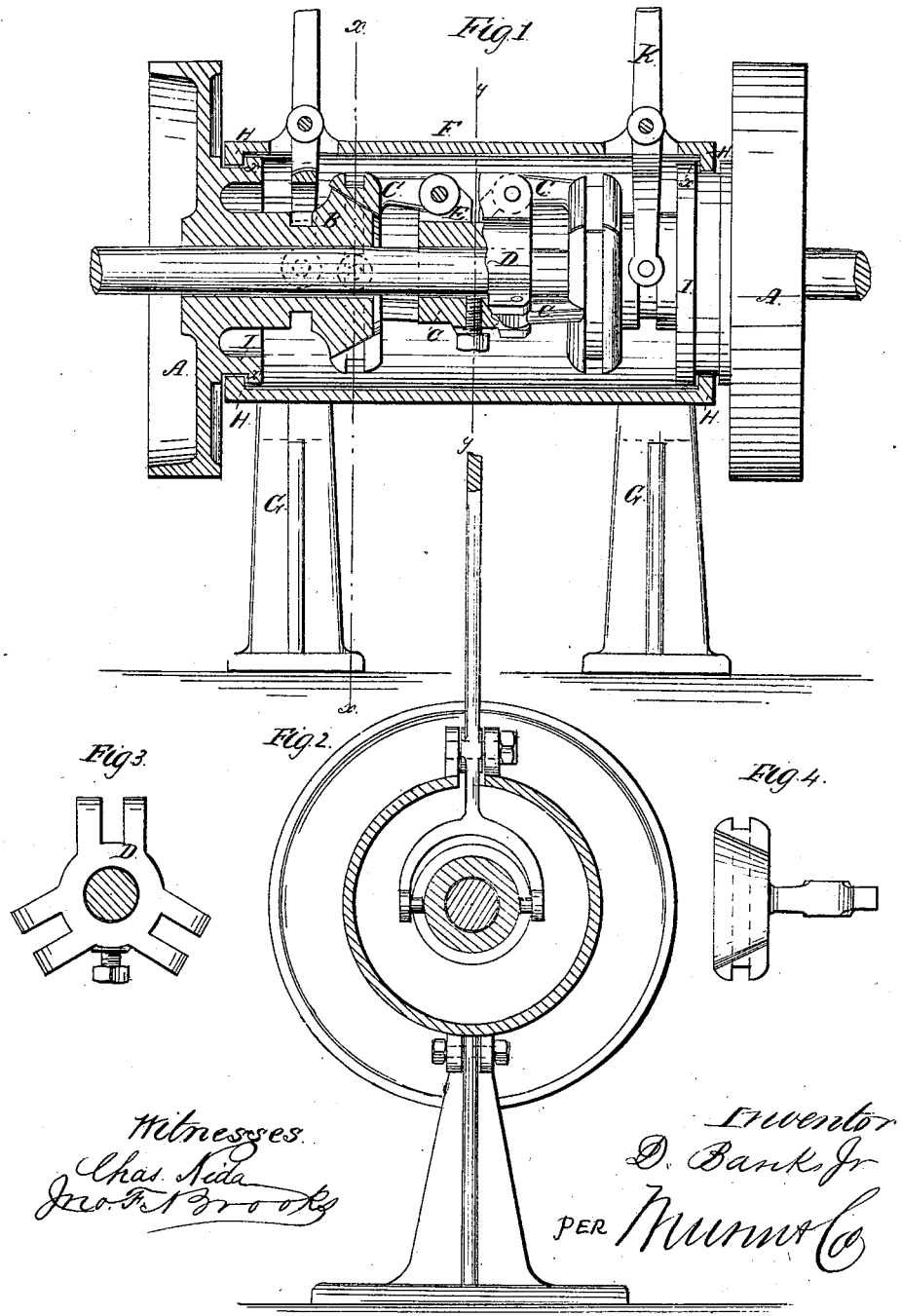

DARIUS BANKS, JR., OF NEW YORK, N. Y.

Letters Patent No. 90,982, dated June 8, 1869.

IMPROVED FRICTION-CLUTCH AND BRAKE.

The Schedule referred to in these Letters Patent and making part of the same.

*To all whom it may concern:*

Be it known that I, DARIUS BANKS, Jr., of New York, in the county of New York, and State of New York, have invented a new and improved Friction-Clutch and Brake; and I do hereby declare that the following is a full, clear, and exact description thereof, which will enable others skilled in the art to make and use the same, reference being had to the accompanying drawings, forming part of this specification.

The object of this invention is to provide a more useful and efficient friction-clutch and brake-attachment, for use especially in operating sewing-machines, but applicable also to other machinery, where it is desirable to stop and start the same frequently, and to stop instantly when the clutch is disengaged.

The invention consists in an arrangement of a loose sliding pulley, with a conical hub, a set of friction-levers, for imparting motion to the said pulley by frictional contact with the said hub, a fixed tubular brake, with one or more internal annular flanges taking into grooves in the hubs of the pulleys and operating-levers, all so arranged that a movement of the said lever in any one direction connects the friction-devices, and disconnects the brake, and the opposite movement disconnects the friction and connects the brake, all as hereinafter more fully specified.

Figure 1 represents a longitudinal sectional view of my improved device, arranged in duplicate for operating two machines;

Figure 2 represents a transverse section taken on the line $x\,x$ of fig. 1;

Figure 3 represents a partial section on the line $y\,y$ of fig. 1; and

Figure 4 represents a detail.

Similar letters of reference indicate corresponding parts.

In an application for a patent for improvements in friction-clutches and brakes, heretofore filed by me, and now pending, I have described an arrangement of a loose pulley, with a cylindrical hub, whereon friction-levers were caused to act by a sliding conical hub, a tubular sliding brake operating against the face of the pulley, and an operating-lever, all so arranged that the friction-clutch is connected and the brake disconnected, by a movement of the lever in one direction, and *vice versa.*

The present arrangement differs from that, in the respect that the conical friction-hub and pulley are made of one piece, and arranged to slide to and from the friction-arms, and that the tubular brake is made stationary, whereby it may be conveniently and cheaply arranged for operation with two sets of friction-clutches, and two pulleys for operating two machines, which is very desirable, especially in large factories, where a great number of sewing or other similar machines is arranged in pairs along benches.

A A represent the sliding driving-pulleys, provided with conical hubs B.

C represents the arms, with friction-pads fitting the said conical hubs, and pivoted to a hub, D, which is secured to the shaft, and arranged for the connection of two sets of arms, fronting each way.

These arms are caused to press on the hubs B by the pressure of the resistance of the lugs E behind the pivot points, upon the bottom of the grooves, wherein the said arms are pivoted, as shown in fig. 3.

F represents the tubular friction-brake, supported upon the stands G, and provided with annular flanges H at each end, projecting into corresponding grooves in projections I, of the pulleys.

K represents the crotched operating-levers, pivoted to the tubular brake where they pass through it, and provided with pins projecting from the ends of the branches into grooves in the hubs of the pulleys, for sliding them back and forth.

From the foregoing description it will be seen, that by moving the levers K in one direction, the conical hubs B will be pressed under the friction-levers, and thereby be set into rotary motion, when the shaft is revolved, and that when moved in the opposite direction, the friction-levers will be disconnected from the hubs, and the walls $x$ of the grooves in the projections I will be brought into contact with the sides of the annular flanges H, producing friction, and suddenly stopping the wheels.

The contrary movement of the levers relieves this friction simultaneously with the connection of the friction-clutch.

Having thus described my invention,

I claim as new, and desire to secure by Letters Patent—

The sliding loose pulleys A, provided with the conical hubs B and annular grooves, the friction-arms C, hubs D, fixed tubular brake F, having annular flanges H, and operating-levers, when combined and arranged substantially as specified.

DARIUS BANKS, JR.

Witnesses:
 FRANK BLOCKLEY,
 ALEX. F. ROBERTS.